(12) United States Patent
Watson et al.

(10) Patent No.: US 8,414,063 B2
(45) Date of Patent: Apr. 9, 2013

(54) VEHICLE BODY STRUCTURE

(75) Inventors: Scott Watson, Novi, MI (US); Adam David Tacey, Wixom, MI (US)

(73) Assignee: Nissan North America, Inc., Franklin, TN (US)

( * ) Notice: Subject to any disclaimer, the term of this patent is extended or adjusted under 35 U.S.C. 154(b) by 4 days.

(21) Appl. No.: 13/189,126

(22) Filed: Jul. 22, 2011

(65) Prior Publication Data

US 2013/0019538 A1 Jan. 24, 2013

(51) Int. Cl.
*B60J 10/08* (2006.01)

(52) U.S. Cl. .................................. 296/146.9

(58) Field of Classification Search .............. 296/146.9; 49/368, 475.1, 479.1, 496.1, 498.1
See application file for complete search history.

(56) References Cited

U.S. PATENT DOCUMENTS

| 5,499,475 A | 3/1996 | Court et al. |
| 6,536,161 B2 | 3/2003 | Saito |
| 7,320,199 B2 | 1/2008 | Ueda et al. |
| 2005/0285351 A1 | 12/2005 | Taguchi et al. |

*Primary Examiner* — H Gutman

(74) *Attorney, Agent, or Firm* — Global IP Counselors, LLP

(57) ABSTRACT

A first seal installed on a first body structure has a first sealing surface extending in a vertical direction and a first sealing projection spaced apart from the first sealing surface. A second seal installed on a second body structure has a second sealing surface extending in the vertical direction and a second sealing projection spaced apart from the second sealing surface. With the second body structure in a closed position and adjacent the first body structure, the second sealing surface contacts the first sealing surface to form a first vertical sealing line between the first and second body structures and the second sealing projection contacts the first sealing projection to form a second vertical sealing line between the first and second body structures along at least upper portions of the first and second body structures by elastic deformation of at least one of the first and second sealing projections.

20 Claims, 14 Drawing Sheets

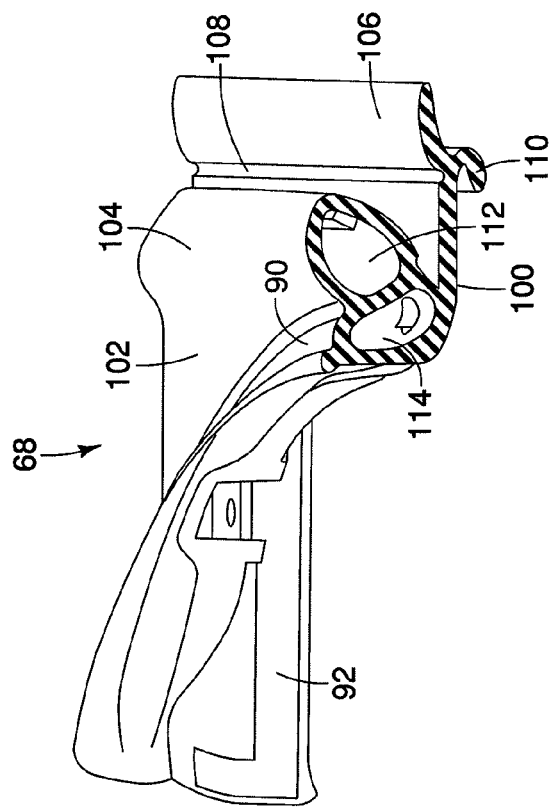
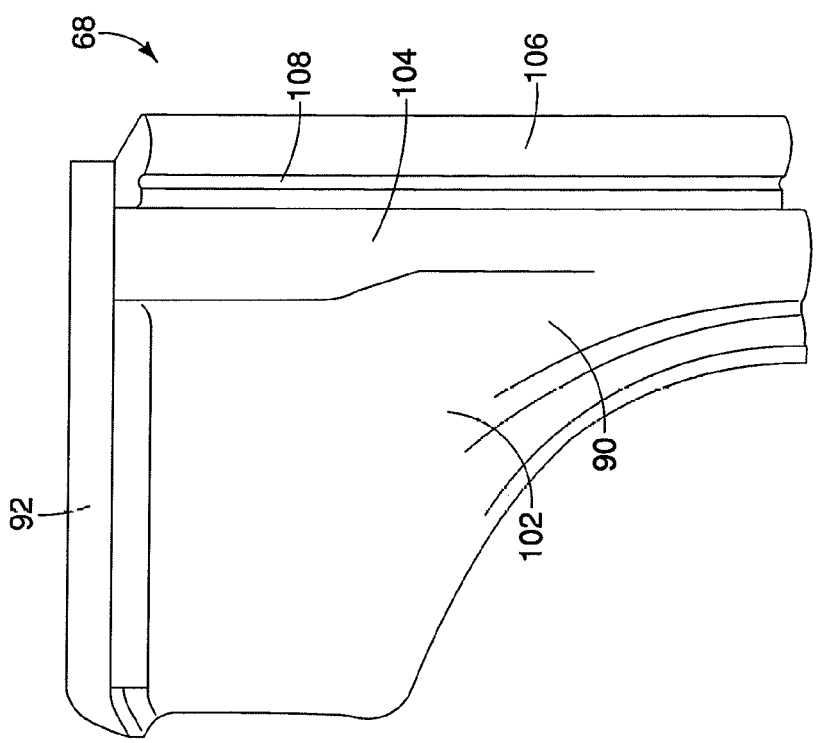
FIG. 11
FIG. 10

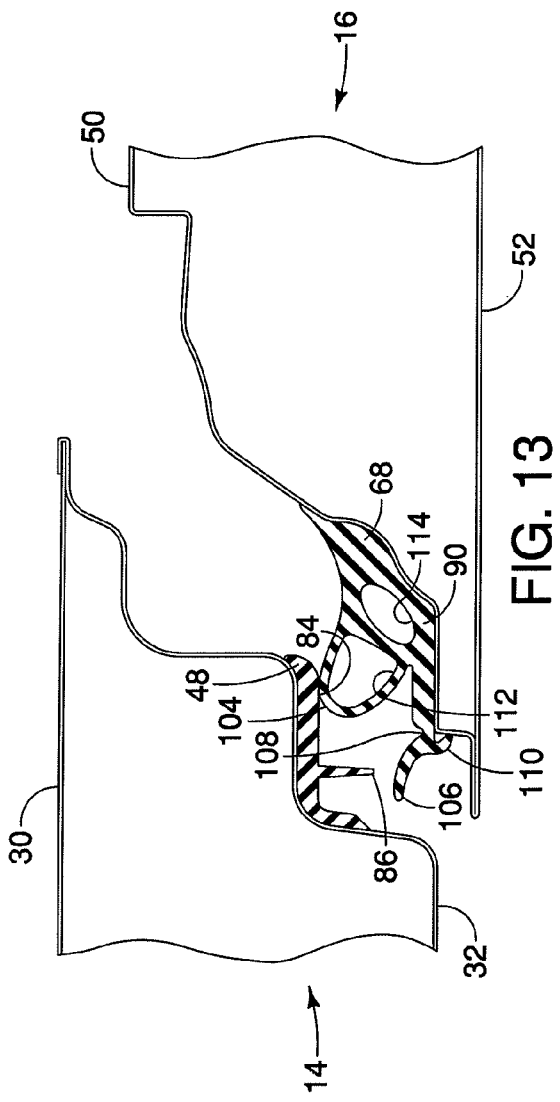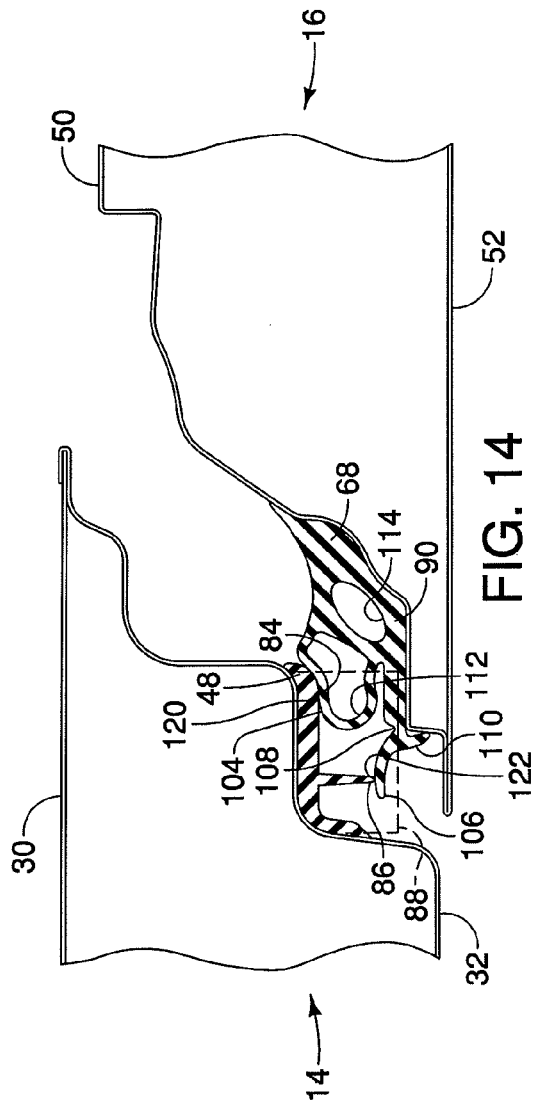

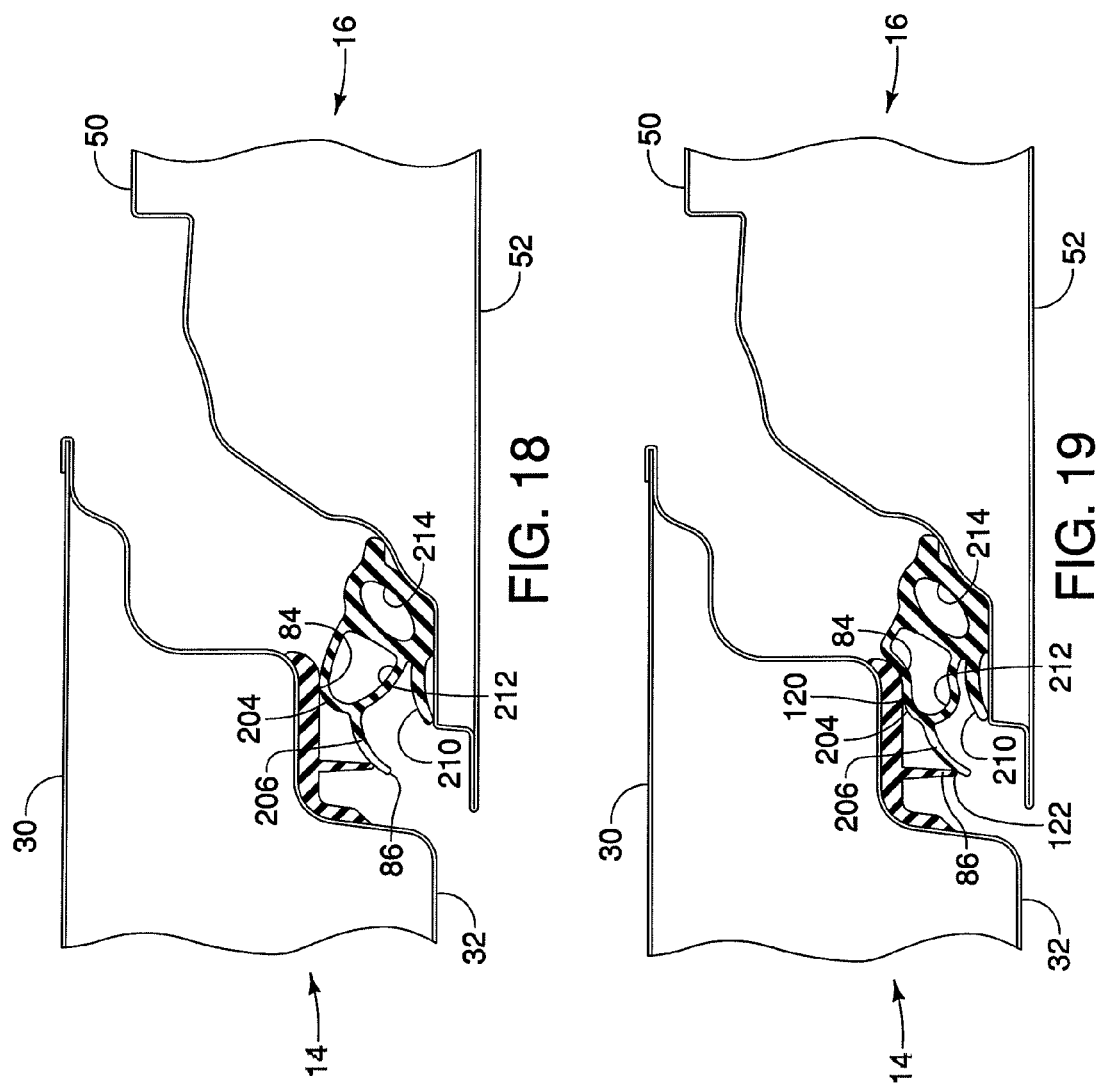

VEHICLE BODY STRUCTURE

BACKGROUND

1. Field of the Invention

The present invention generally relates to a vehicle body structure. More specifically, the present invention relates to a seal arrangement between rear doors of a vehicle body structure.

2. Background Information

Vehicles that include large doors, such as vans and commercial vehicles, typically include weather stripping around those doors to keep water and weather from entering the vehicle.

SUMMARY

One object is to provide a sealing system between a vehicle body structure and a vehicle door, where the door includes a surface that overlaps the vehicle body structure, and the sealing system provides two separate sealing lines to prevent the ingress of water into the vehicle with the door closed.

In view of the state of the known technology, a vehicle body structure includes a first body structure, a second body structure, a first seal and a second seal. The second body structure is movably mounted relative to the first body structure between an open position in which the second body structure exposes an opening in the vehicle body structure and a closed position in which the second body structure conceals the opening in the vehicle body structure. The first seal is installed on one of the first and second body structures. The first seal has a first sealing surface extending in a vertical direction of the vehicle body structure and a first sealing projection spaced apart from the first sealing surface. The second seal is installed on the other of the first and second body structures. The second seal has a second sealing surface extending in the vertical direction of the vehicle body structure and a second sealing projection spaced apart from the second sealing surface. The first and second sealing surfaces and the first and second sealing projections extend such that with the second body structure in the closed position and adjacent the first body structure, the second sealing surface contacts the first sealing surface to form a first vertical sealing line between the first and second body structures and the second sealing projection contacts the first sealing projection to form a second vertical sealing line between the first and second body structures along at least upper portions of the first and second body structures by elastic deformation of at least one of the first and second sealing projections.

BRIEF DESCRIPTION OF THE DRAWINGS

Referring now to the attached drawings which form a part of this original disclosure:

FIG. 10 is an elevation view of an outer surface of the second seal showing the second sealing surface, the second projection and the bending section in accordance with the first embodiment;

FIG. 11 is a bottom cross-sectional view of the second seal showing the second sealing surface, the second projection and the bending section in accordance with the first embodiment;

FIG. 13 is a cross-sectional view of the vehicle body structure showing the first door in the closed position and the second door in an intermediate position with the second seal contacting the first seal in accordance with the first embodiment;

FIG. 14 is a cross-sectional view of the vehicle body structure showing the first door in the closed position and the second door in the closed position with the second seal pressing against the first seal in accordance with the first embodiment;

FIG. 18 is a cross-sectional view of the vehicle body structure showing the first door in the closed position and the second door in an intermediate position with the second seal contacting the first seal in accordance with the second embodiment; and FIG. 19 is a cross-sectional view of the vehicle body structure showing the first door in the closed position and the second door in the closed position with the second seal pressing against the first seal in accordance with the second embodiment.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
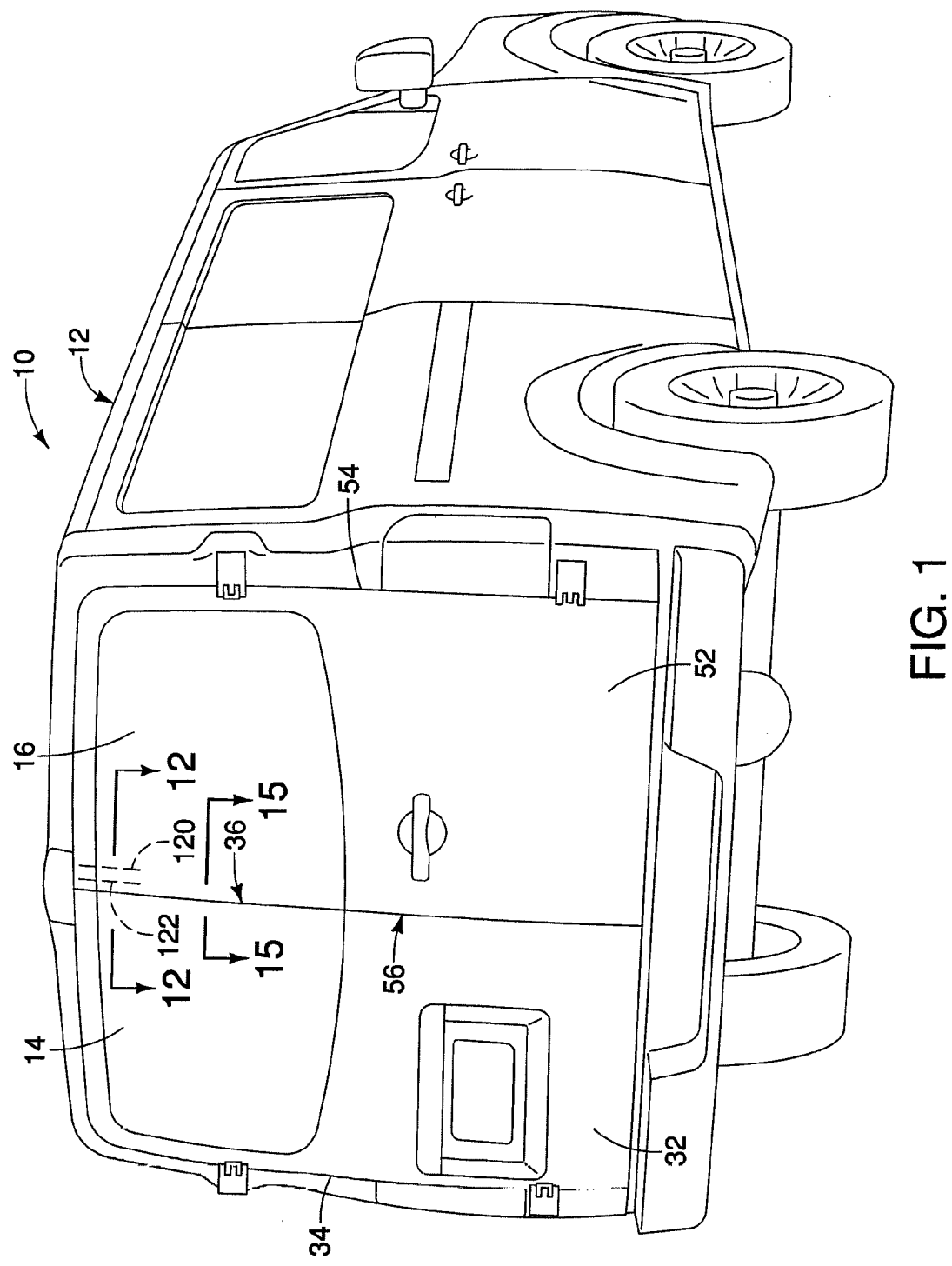
FIG. 1 is a perspective rear view of a vehicle with a vehicle body structure that includes a first door and a second door, where the second door overlaps a side surface of the first door with both the first and second doors in closed positions.

Referring initially to FIG. 1, a vehicle 10 is illustrated in accordance with a first embodiment. The vehicle 10 includes a body structure 12 with a first door 14 (a first body structure), a second door 16 (a second body structure) and a seal arrangement between the first and second doors 14 and 16 to prevent the ingress of water to an interior compartment 20 (FIG. 2) of the vehicle 10. The seal arrangement is described in greater detail below following a brief description of selected elements of the body structure 12.

Figure 2:
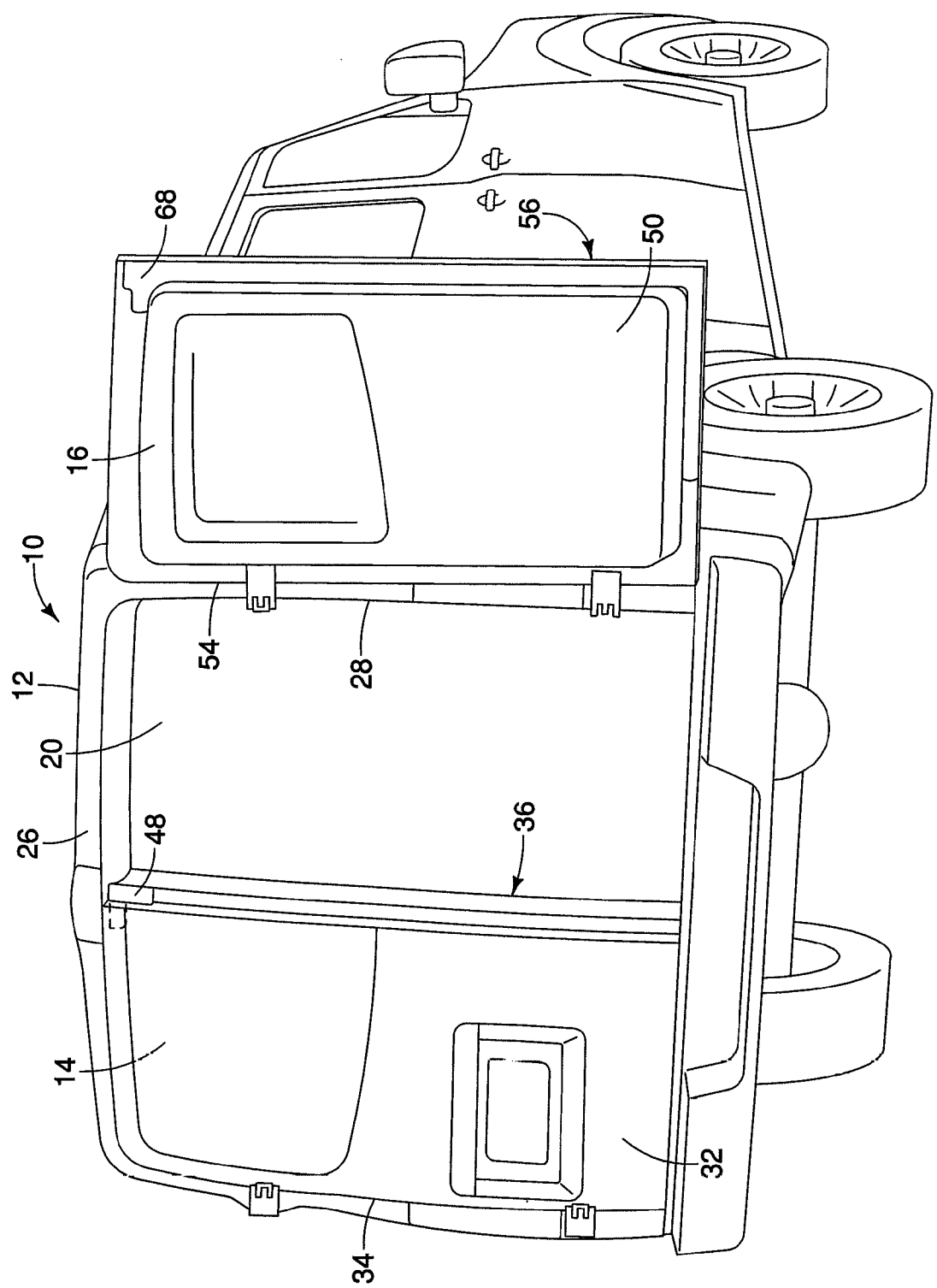
FIG. 2 is a rear elevation view of the vehicle showing the first door in a closed position and the second door in an open position exposing an interior of the vehicle and exposing a side surface of the first door and a side surface of the second door.

As best shown in FIG. 2, the body structure 12 includes a rear end section 26 that defines an opening 28. The opening 28 leads to the interior compartment 20 of the vehicle 10. The first door 14 and the second door 16 are pivotally mounted to the rear end section 26 such that with the first and second doors 14 and 16 in their respective closed positions as shown in FIG. 1, the first and second doors 14 and 16 cover and conceal the opening 28. As shown in FIG. 2, the second door 16 (the second body structure) is movably mounted to the rear end section 26 for movement between an open position (FIG. 2) in which the opening 28 in the vehicle body structure 12 is exposed and a closed position (FIG. 1) in which the second door 16 conceals (closes) the opening 28 in the vehicle body structure 12. The first door 14 (the first body structure) is similarly movably mounted to the rear end section 26 for movement between an open position and a closed position.

The first door 14 includes an interior surface 30 (FIGS. 12-15), an exterior surface 32 (FIGS. 2, 3 and 12-15), a hinged side 34 and a side surface 36. The hinged side 34 includes a pair of hinges fixed to the rear end section 26 of the body structure 12 such that the first door 14 can pivot between the closed position (FIG. 1) and the open position, in a conventional manner. The side surface 36 is a doorface that is defined as a surface of a door that is not visible from the outside or the inside of the door when both the first and second doors 14 and 16 are in their respective closed positions.

Figure 3:
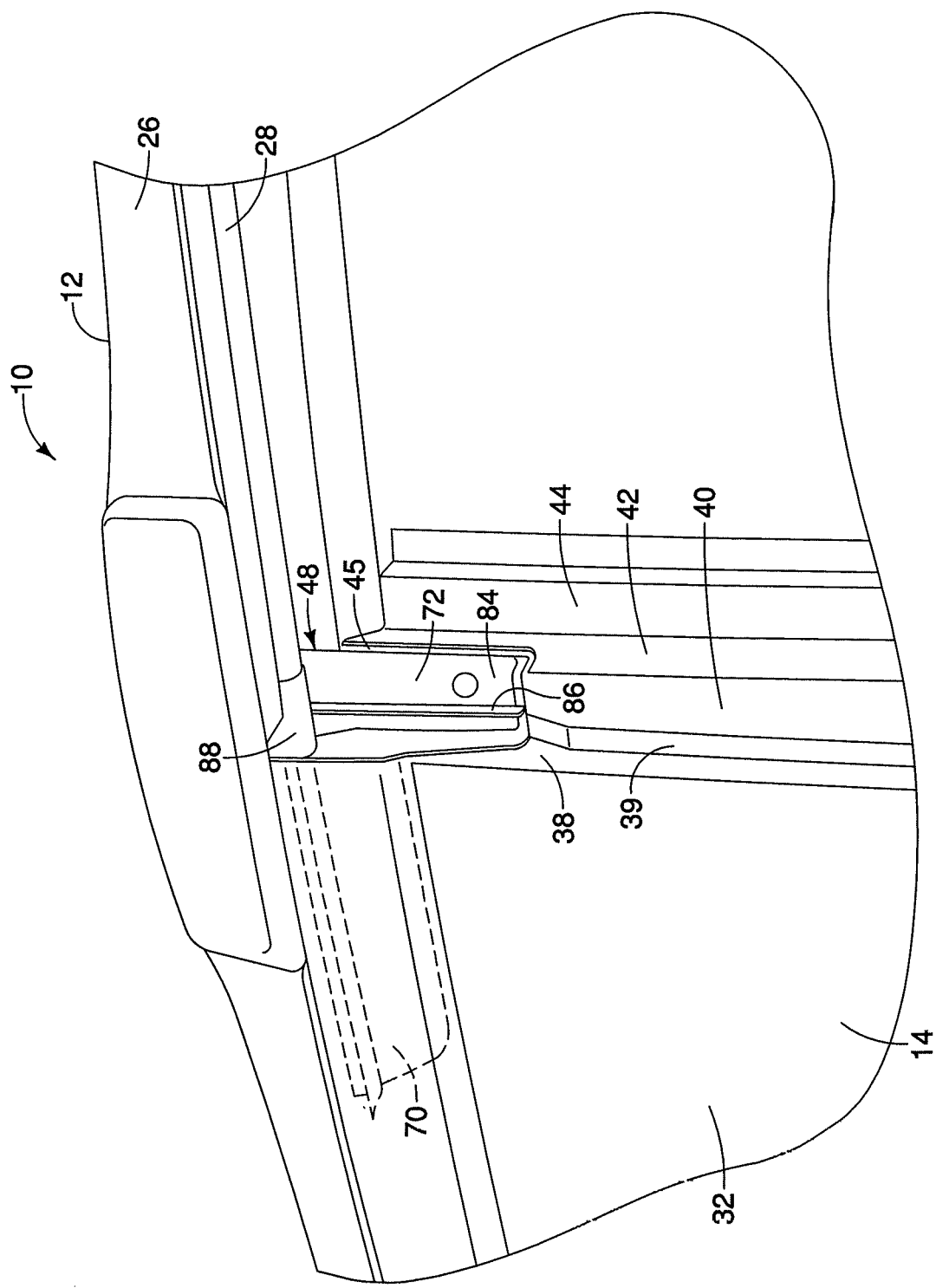
FIG. 3 is a perspective view of a portion of the first door showing an upper section of the side surface with a first seal installed to the upper section of the side surface.
Figure 4:
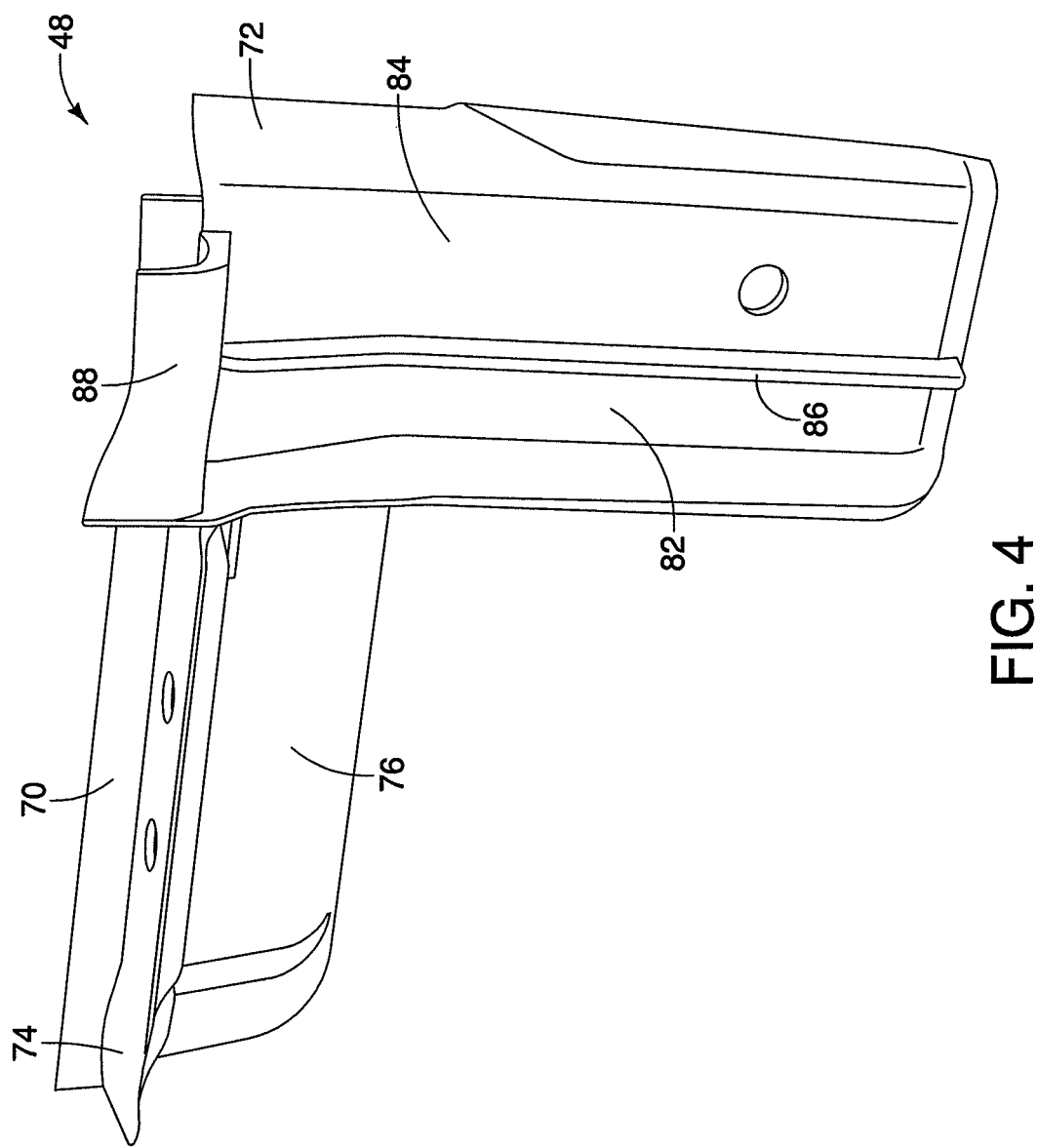
FIG. 4 is a perspective view of the first seal shown removed from the side surface of the first door, the first seal having a first sealing surface and a first projection.
Figure 7:
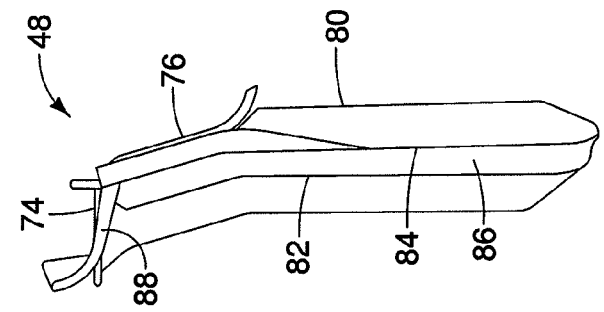
FIG. 7 is a side view of the first seal showing the first projection and upper sealing projection.
Figure 6:
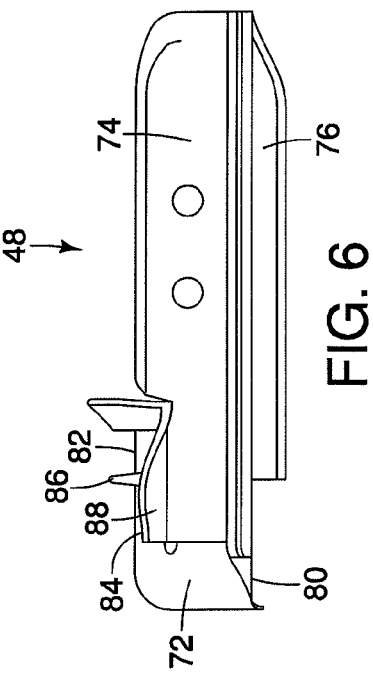
FIG. 6 is a top view of the first seal showing the first sealing surface, the first projection and upper sealing projection.
Figure 5:
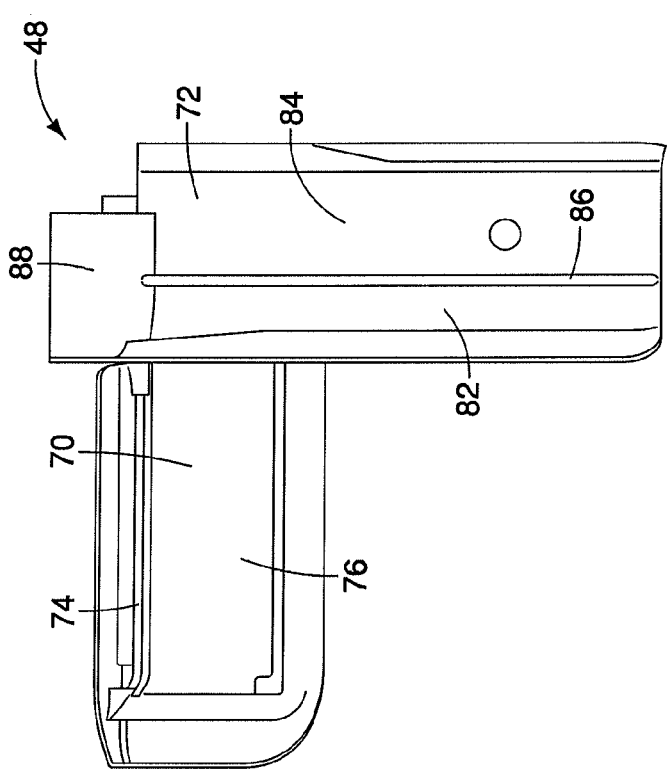
FIG. 5 is an elevation view of an outer surface of the first seal showing the first sealing surface, the first projection and upper sealing projection.
Figure 12:
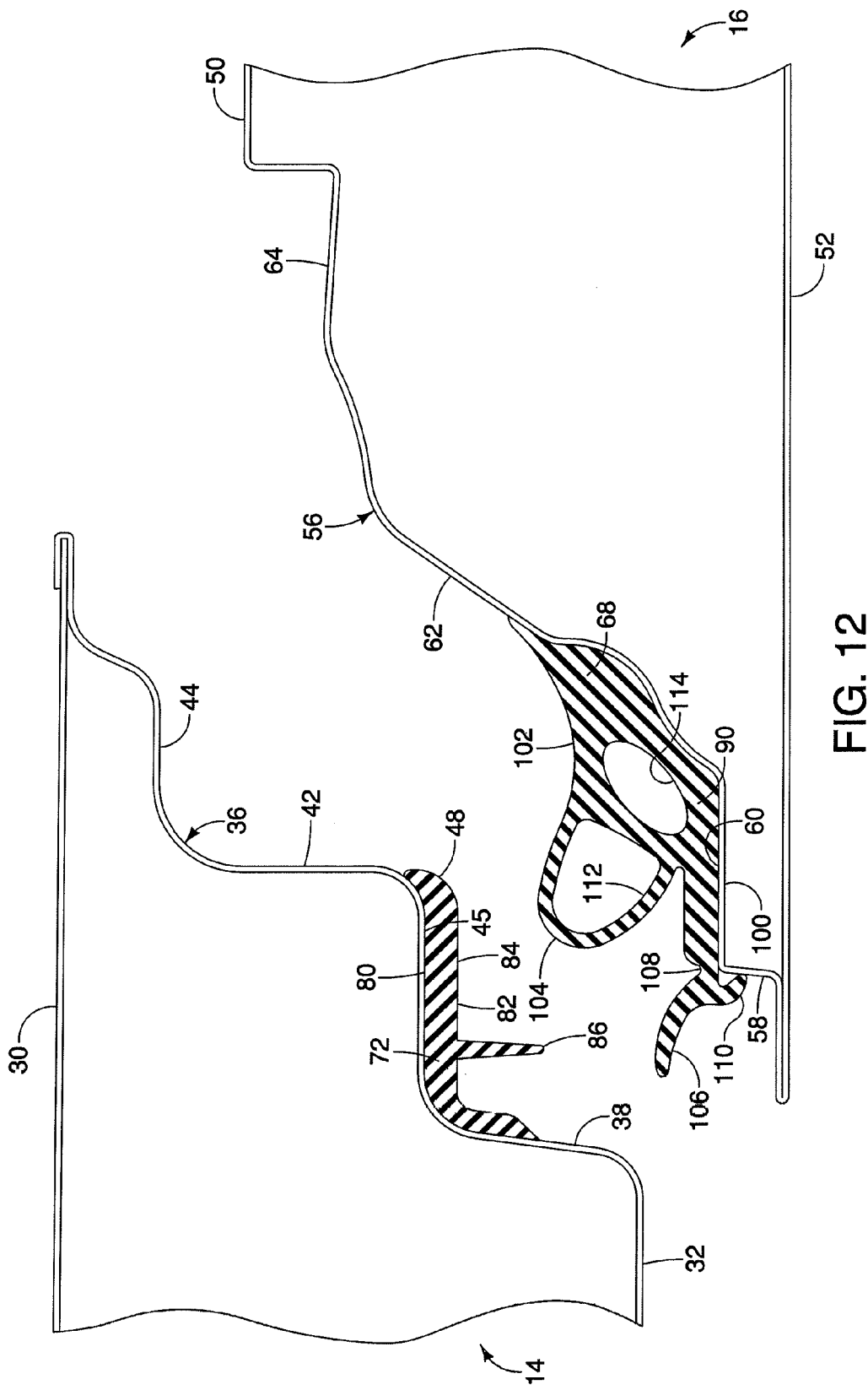
FIG. 12 is a top cross-sectional view of the vehicle body structure taken along the line 12-12 in FIG. 1, showing the first door in the closed position and the second door in a partially open position with the second seal being spaced apart from the first seal in accordance with the first embodiment.

As best shown in FIG. 12, the side surface 36 includes several contoured sections, such as section 38, section 39, section 40, section 42 and section 44, that all extend in a vertical direction. The sections 40 and 44 are stepped surfaces in that they extend in directions that are approximately parallel to one another, but are spaced apart from one another, with the section 42 extending therebetween. A first seal 48 is installed to an upper end of the side surface 36 as shown in FIGS. 2 and 3 and described in greater detail below.

As best shown in FIG. 2, the side surface 36 of the first door 14 having the first seal 48, faces in an outbound direction of the vehicle body structure 12. Further, the side surface 36 can also include a small recessed area 45 dimensioned to receive the first seal 48. This small recess 45 is present in the depicted side surface 36, but is partially hidden by the first seal 48.

In the depicted embodiment, the first seal 48 extends in a vertical direction from the top of the first door 14 downward along only a portion of the overall height of the first door 14. More specifically, the vertical dimension of the first seal 48 is preferably between 5 and 20 percent of the overall height of the first door 14. However, the vertical dimension of the first seal 48 can be greater or smaller depending upon the configuration of the first door 14 and the second door 16. The design and dimensions of the first seal 48 are provided to prevent ingress of water primarily at an upper corner of the first door 14 where the second door 16 overlaps the first door 14, as is described in greater detail below.

The second door 16 includes an interior surface 50 (FIGS. 2, 8 and 12-15), an exterior surface 52 (FIGS. 1 and 12-15), a hinged side 54 and a side surface 56. The hinged side 54 includes a pair of hinges fixed to the rear end section 26 of the body structure 12 such that the second door 16 can pivot between the closed position (FIG. 1) and an open position (FIG. 2), in a conventional manner. The side surface 56 is a doorface that is defined as a surface of a door that is not visible from the outside or the inside of the door when both the first and second doors 14 and 16 are in the closed position.

Figure 8:
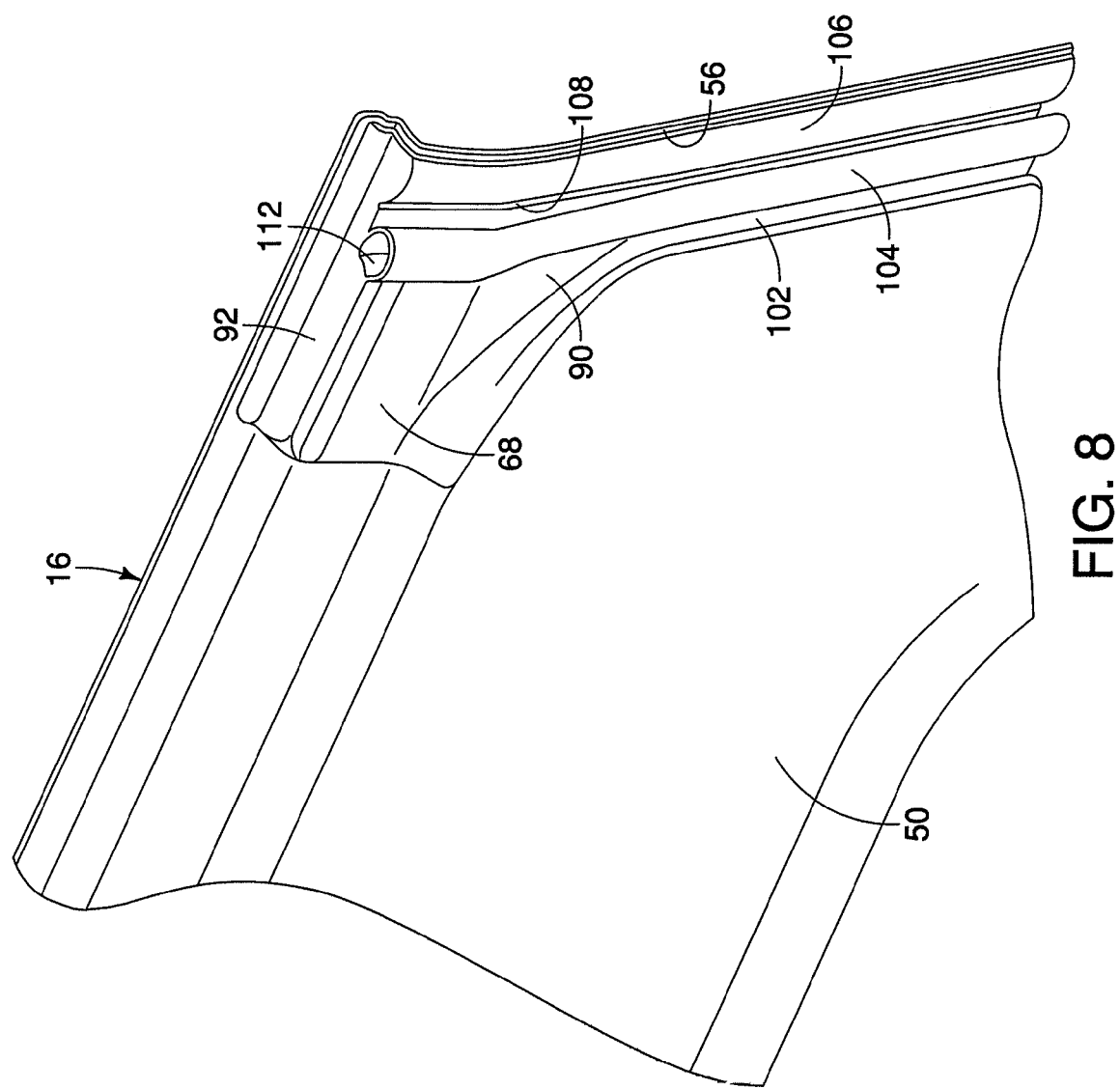
FIG. 8 is a perspective view of a portion of the second door showing an upper section of the side surface with a second seal installed to the upper section of the side surface.

As best shown in FIG. 12, the side surface 56 includes several contoured sections, such as section 58, section 60, section 62 and section 64, that all extend in a vertical direction. The sections 60 and 64 are stepped surfaces in that they extend in directions that are approximately parallel to one another, but are spaced apart from one another, with the section 62 extending therebetween. The section 62 has a contoured surface that is non-planar in the region of the cross-section of FIG. 12. The side surface 56 of the second door 16 faces in an inbound direction of the vehicle body structure 12. A second seal 68 is installed to an upper end of the side surface 56 as shown in FIGS. 2 and 8 and described in greater detail below.

It should be understood from the drawings and the description herein that the contoured sections of the first door 14 (sections 38, 40, 42 and 44) and the contoured sections of the section door 16 (sections 58, 60, 62 and 64) define contoured surfaces that can include both planar portions and curved portions that blend in and out of one another at various vertical heights along the first and second doors 14 and 16. However the sections 38, 40, 42 and 44 of the side surface 36 of the first door 14 are designed and dimensioned such that when the first door 14 and the second door 16 are both in the closed position as shown in FIG. 14, sections 58, 60, 62 and 64 of the side surface 56 of the second door 16 overlap the side surface 36. Contact between the first seal 48 and the second seal 68 creates a water blocking seal at an upper region between the first door 14 and the second door 16. More specifically, the side surface 56 of the second door 16 is arranged to overlap with the side surface 36 of the first door 14 as viewed perpendicular to the exterior surfaces of the first and second doors 14 and 16. This overlap of the side surface 36 and the side surface 56 occurs while the first and second doors 14 and 16 are both in the closed positions with the first and second seals 48 and 68 contacting each other.

A description of the first seal 48 is now provided with specific reference to FIGS. 4-7. The first seal 48 includes a base section divided into a first portion 70 and a second portion 72. When installed to the first door 14, the first portion 70 of the first seal 48 extends in a generally horizontal direction and the second portion 72 extends in a generally vertical direction. The first portion 70 includes a top section 74 and a back section 76. The top section 74 includes two apertures that receive fasteners (not shown) that fix the top section 74 to an upper surface of the first door 14. The back section 76 lies along an upper end of the interior surface 30 of the first door 14, as indicated in FIG. 3.

The second portion 72 of the first seal 48 has a mounting side 80 and a sealing side 82. The second portion 72 also includes at least one aperture that receives a fastener (not shown) extending between the mounting side 80 and the sealing side 82 that fixes the second portion 72 to the side surface 36 of the first door 14. The mounting side 80 is contoured fit within the recess 45 and to mate with the sections 38, 40 and 42 of the side surface 36 of the first door 14, as indicated in FIGS. 12-14. The sealing side 82 basically includes a first sealing surface 84, a first sealing projection 86 and an upper sealing projection 88.

The first sealing surface 84 extends in a vertical direction relative to the vehicle body structure 12. In cross-section, as shown in FIGS. 12-14, the first sealing surface 84 has a flat or planar appearance. However, the overall vertical contour of the first sealing surface 84 can include a slight vertical curvature. The first sealing surface 84 is defined as that portion of the mounting side 80 that contacts a portion of the second seal 68, as described in greater detail below. As can be seen in FIGS. 13 and 14, the first sealing projection 86 is spaced apart from the first sealing surface 84 relative to contact with the second seal 68.

The first sealing projection 86 is a projection that extends outward from the second portion 72 of the first seal 48. Preferably, the first sealing projection 86 extends in a direction that is approximately perpendicular to the first sealing surface 84. The first sealing projection 86 is in the form of a rib extending in the vertical direction relative to the vehicle body structure 12, with the first seal 48 installed to the first door 14.

The upper sealing projection 88 is fixed to an upper end of the second portion 72 of the first seal 48. The upper sealing projection 88 is a generally horizontally extending section of seal material that extends over an upper end of the first sealing surface 84 and an upper end of the first sealing projection 86. Preferably, the upper sealing projection 88 is an integral part of the first seal 48.

The first seal 48 is preferably made of a resilient polymer, rubber or plastic material having resilient properties able to undergo repeated elastic deformation. However, the first seal 48 is preferably less resilient than the second seal 68. Preferably, the first seal 48, including the first sealing surface 84, the first sealing projection 86 and the upper sealing projection 88 are all unitarily formed as a single monolith element with the second portion 72 (the base section). Still more preferably, both the first portion 70 and the second portion 72 are unitarily formed as a single monolith element.

A description of the second seal 68 is now provided with specific reference to FIGS. 9-14. The second seal 68 includes a base section 90 and a top section 92. The base section 90 has a mounting side 100 and a sealing side 102. As indicated in FIG. 12, the mounting side 100 is shaped and configured to lie against the section 60 and a portion of the section 62 of the side surface 56 of the second door 16.

As best shown in FIGS. 9-12, the sealing side 102 includes a second sealing surface 104, a second sealing projection 106, a vertical bending section 108 and a third sealing projection 110. The second seal 68 further includes a first hollow portion 112 (FIGS. 1 and 11-14) and a second hollow portion 114 (FIGS. 12-15). The first hollow portion 112 is disposed between the base section 90 and the second sealing surface 104.

The first hollow portion 112 is basically an elongated tube that extends the height of the second seal 68. The second sealing surface 104 is defined on an outer most section of the first hollow portion 112 such that the second sealing surface 104 also extends the full height of the second seal 68.

As indicated in FIG. 2, the second seal 68 can be manufactured with dimensions that allow it to extend along the entire height of the side surface 56 of the second door 68. Alternatively, the second seal 68 can be truncated such that it is only positioned at the upper end of the side surface 56 of the second door 68. In other words, the second seal 68 is dimensioned to form a seal with the first seal 48, but can continue below the first seal 48. More specifically, as depicted in FIG. 2, the second seal 68 extends from the top of the second door 16 to the bottom of the second door 16. Consequently, the second seal 68 forms a seal with the first seal 48 and further forms a seal along all of the side surface 36 of the first door 14 below the first seal 48, with both the first and second doors 14 and 16 in their respective closed positions.

The second sealing projection 106 is basically a lip that extends away from the base section 90, as shown in FIG. 12. The second sealing projection 106 extends vertically along the entire height of the second seal 68. In other words, the second sealing projection 106 forms a lip seal that extends in the vertical direction relative to the vehicle body structure 12. As can be seen in FIGS. 13 and 14, the second sealing projection 106 is spaced apart from the second sealing surface 104 relative to contact with the first seal 48.

The vertical bending section 108 is a groove or recess that extends the vertical height of the second seal 68. The vertical bending section 108 is disposed between the base section 90 and the second and third sealing projections 106 and 110 such that elastic deformation of the second seal 68 occurs while the second door 16 (the second body structure) is in the closed position with the first and second seals 48 and 68 contacting each other. This elastic deformation causes the second seal 68 to bend along the vertical bending section 108 with respect to the base section 90, as shown in FIG. 14. The bending of the vertical bending section 108 serves as a hinge that allows slight elastic movement of the second sealing projection 106 relative to the base portion 90, as shown in FIG. 14.

The third sealing projection 110 is another lip seal that extends in a direction opposite from the second sealing projection 106. The third sealing projection 110 has an initial unstressed state (see FIGS. 12 and 13) while the second door 16 (the second body structure) is in the open position and a deformed state occurring while the second door 16 is in the closed position with the first and second seals 48 and 68 contacting each other (FIG. 14). The third sealing projection 110 is configured and arranged relative to the side surface 56 of the second door 16 such that elastic deformation of the third sealing projection 110 from the initial unstressed state to the deformed state causes the third sealing projection 110 to be pressed against the section 58 of the side surface of the second door 16. In other words, when the second sealing projection 106 is pressed against the first sealing projection 86, the third sealing projection 110 presses against the section 58 of the side surface 56 of the second door 16, as shown in FIG. 14. The third sealing projection 110 provides a force that counteracts the force of the first sealing projection 86 elastically deforming the second sealing projection 106 when the second door 16 is closed against the first door 14, as shown in FIG. 14. Thus, the third sealing projection 110 pushes, presses or otherwise provides force that assists in maintaining a sealing relationship between the second sealing projection 106 and the first sealing projection 86 with the second door 16 in the closed position, as shown in FIG. 14.

Figure 9:
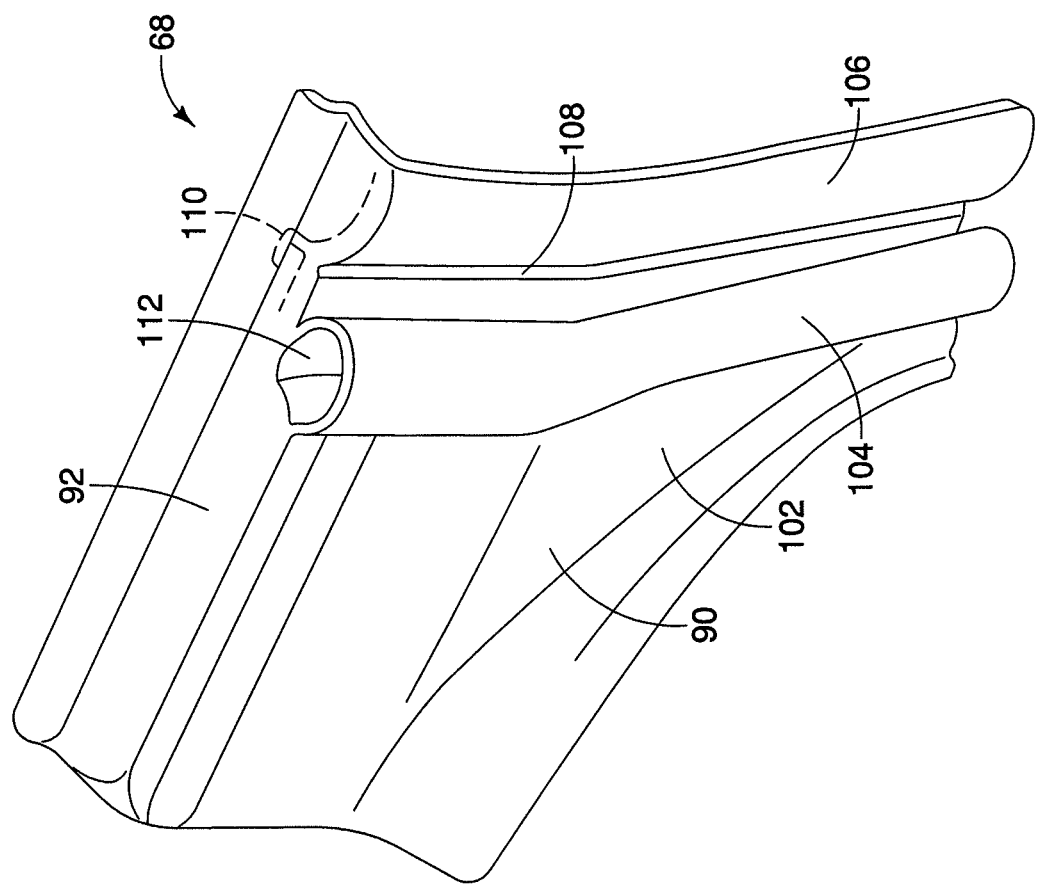
FIG. 9 is a perspective view of the second seal shown removed from the side surface of the second door, the second seal having a second sealing surface, a second projection and a bending section in accordance with a first embodiment.

The top section 92 is a lip or section of seal material that covers an upper end of the second sealing projection 106 and the third sealing projection 110, as shown in FIG. 9. In the depicted embodiment, the first hollow portion 112 includes an opening within the top section 92, but the second hollow portion 114 is covered by the top section 92.

The first hollow portion 112 includes a hollow interior that is provided to account for engineering tolerances that typically exist between to structures that move relative to one another. In other words, since the second sealing surface 104 is provided on a hollow but elastic structure, reliable contact between the first sealing surface 84 and the second sealing surface 104 is ensured.

The second hollow portion 114 is also provided to ensure resilient flexibility of the second seal 68.

The top section 92 along with the second sealing surface 104, the second sealing projection 106, the third sealing projection 110, the first hollow portion 112 and the second hollow portion 114 are all unitarily formed as a single monolith element with the base section 90. The second seal 68 is preferably made of a plastic, rubber or polymer material that is flexible and resilient and retains its overall shape after repeated elastic deformation.

FIGS. 12-14 show the first door 14 in the closed position. FIG. 12 shows the second door 16 in an intermediate position where the second door 16 is adjacent to the first door 14, but is still open. In FIG. 13, the second door 16 is moved closer to the first door 14 such that the second sealing surface 104 just begins to make contact with the first sealing surface 84 of the first seal 48. FIG. 14 shows the second door 16 in the closed position. As shown in FIG. 14 (and indicated in FIG. 1), the first sealing surface 84 and the second sealing surface 104 extend such that the second sealing surface 104 contacts the first sealing surface 84 to form a first vertical sealing line 120 between the first and second doors 14 and 16. Further, with the second door 16 in the closed position, the second sealing projection 106 contacts the first sealing projection 86 to form a second vertical sealing line 122 between the first and second doors 14 and 16. As in indicated in FIG. 1, the first and second vertical sealing lines 120 and 122 extend vertically along at least upper portions of the first and second doors 14 and 16 by elastic deformation of at least one of the first sealing projection 86 and the second sealing projection 106.

As is indicated in FIG. 14, the upper sealing projection 88 being a horizontally extending projection, extends over respective upper ends of the first sealing surface 84, the second sealing surface 104, the first sealing projection 86 and the second sealing projection 106 while the second door 16 is in the closed position with the first and second seals 48 and 68 contacting each other.

The first vertical sealing line 120 and the second vertical sealing line 122 depicted in FIG. 1 are defined between the first seal 48 and the second seal 68 only. Accordingly, the second seal 68 can extend along the height of second door 16 as far as the first seal extends along the height of the first door 14. However, as mentioned above, the second seal 68 can also extend the full height of the second door 16, and the first seal 48 can be seated in the recess 45 at the top of the side surface 36 of the first door 14. In this arrangement, with the first and second doors 14 and 16 in the closed positions, the second sealing surface 104 can contact both of the first sealing surface 84 at the recess 45 and the section 40 below the recess 45 to form the first vertical sealing line 120 substantially continuously along the full height of the first and second doors 14 and 16.

Figure 15:
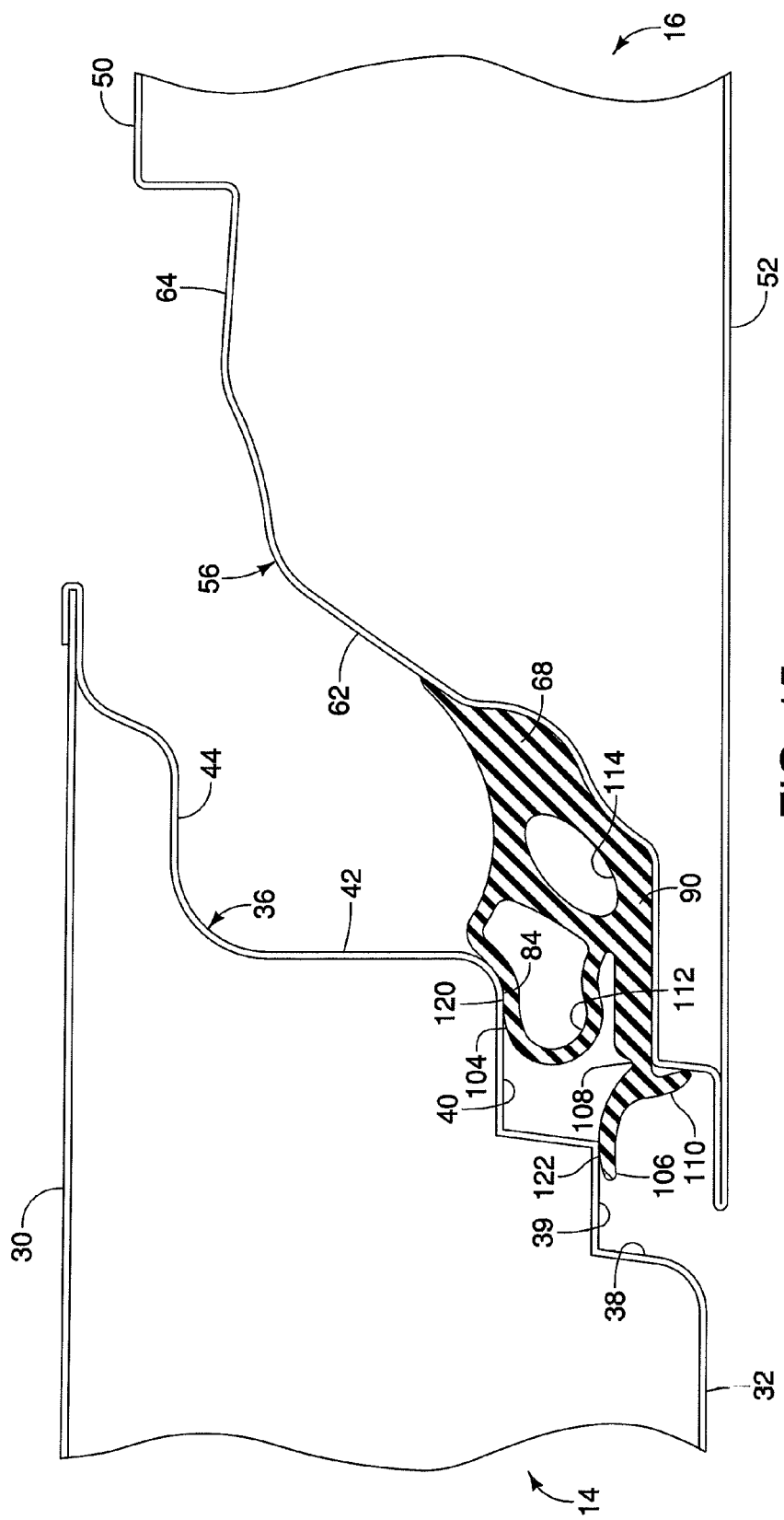
FIG. 15 is a top cross-sectional view of the vehicle body structure taken along the line 15-15 in FIG. 1, showing the first and second doors in their closed positions with the second seal pressing against the side surface of the first door in accordance with the first embodiment.

Similarly, the second sealing projection 106 can contact both of the first sealing projection 86 at the recess 45 and the section 39, which extends between section 38 and section 40, below the recess 45 to form the second vertical sealing line substantially continuously along the full height of the first and second doors 14 and 16, as shown in FIG. 15. Consequently, although not indicated in the drawings, the first vertical sealing line 120 and the second vertical sealing line 122 extend the full height of the first and second doors 14 and 16. In an alternative embodiment, the first seal 48 can be modified such that the first seal 48 also extends the full height of the first and second doors 14 and 16 to form the first vertical sealing line 120 and the second vertical sealing line 122 along the full height of the first and second doors.

Second Embodiment

Referring now to FIGS. 16-19, a second seal 168 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the first door 14, the second door 16 and the first seal 48 are unchanged compared to the first embodiment. However, the second seal 68 is replaced with the second seal 168 in the second embodiment.

Figure 16:
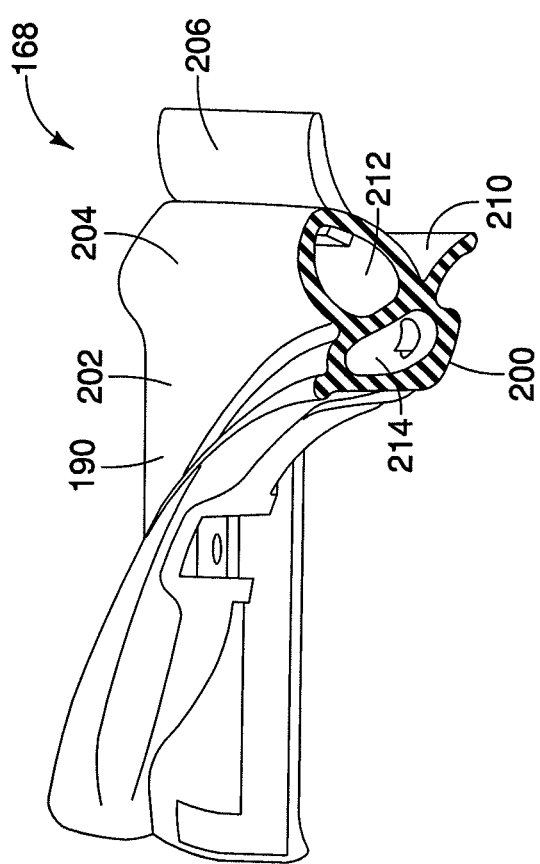
FIG. 16 is a bottom cross-sectional view of a second seal showing a second sealing surface and a second projection in accordance with a second embodiment.

As shown in FIG. 16, the second seal 168 includes a base portion 190 that includes a mounting side 200 and a sealing side 202. Like the second seal 68 of the first embodiment, the mounting side 200 is shaped to conform to the side surface 56 of the second door 16. More specifically, the mounting side 200 is shaped to or slightly deforms upon installation to conform to the overall shape of the section 60 and a portion of the section 62 of the side surface 56 of the second door 16.

The sealing side 202 of the base portion 190 includes a second sealing surface 204, a second sealing projection 206 and a third sealing projection 210. The second seal 168 further includes a first hollow portion 212 and a second hollow portion 214 that provide resilience to the structure of the second seal 168.

Figure 17:
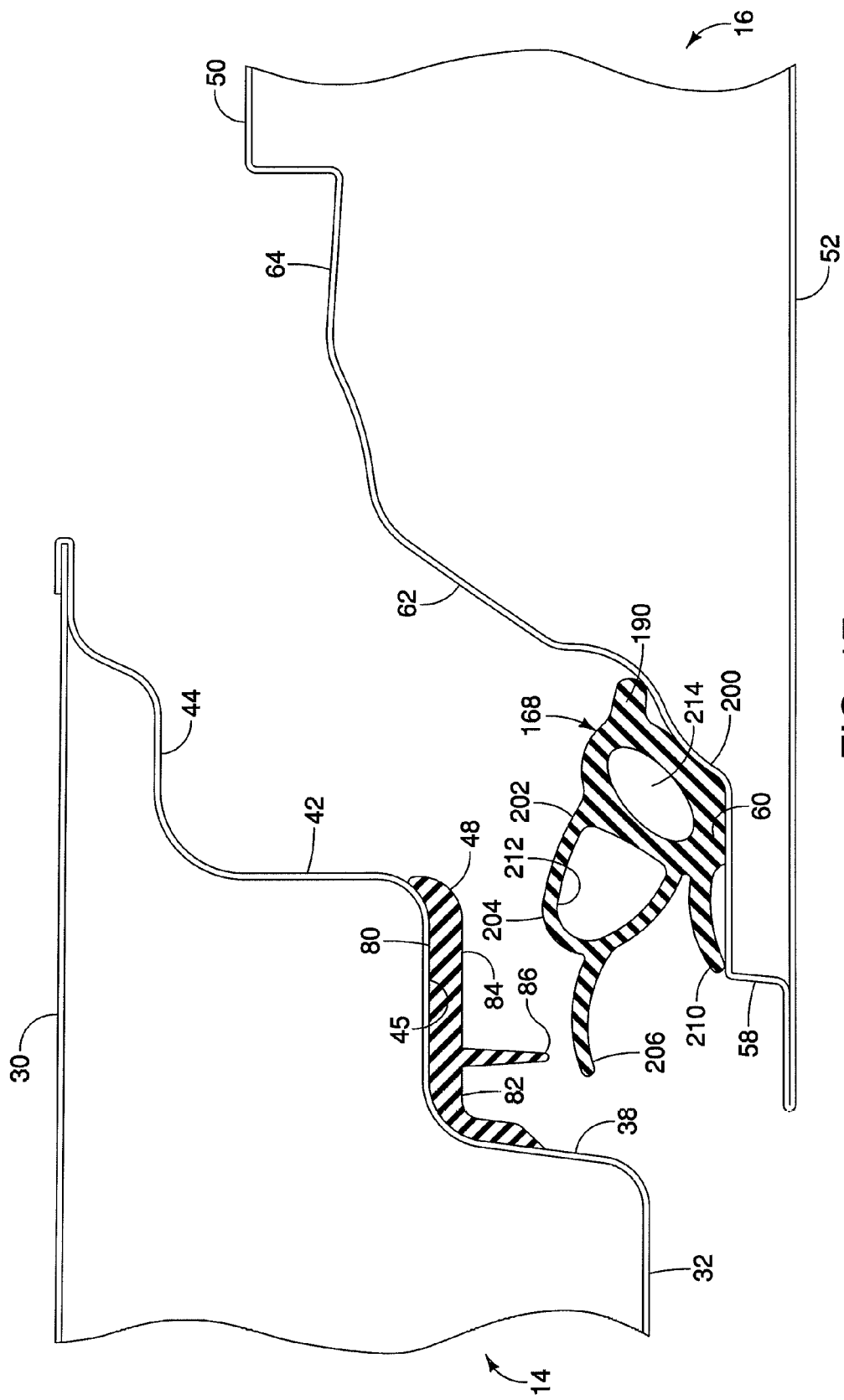
FIG. 17 is a cross-sectional view of the vehicle body structure similar to FIG. 12, showing the first door in the closed position and the second door in a partially open position with the second seal being spaced apart from the first seal in accordance with the second embodiment.

The first hollow portion 212 and the second hollow portion 214 are basically tube-like structures that extend the vertical height of the second seal 168. The second sealing surface 204 is located on the first hollow portion 212, as indicated in FIGS. 17-19. The second sealing surface 204, like the second sealing surface 104 of the first embodiment, extends the vertical height of the second seal 168 and is dimensioned to form the first sealing line 120 when brought into contact with the first sealing surface 84 of the first seal 48, as indicated in FIG. 19.

The second sealing projection 206 is basically a lip seal that extends out from the first hollow portion 212. The second sealing projection 206, like the second sealing projection 106 of the first embodiment, extends the vertical height of the second seal 168 and is dimensioned to form the second sealing line 122 when brought into contact with the first sealing projection 86 of the first seal 48, as indicated in FIG. 19.

The third sealing projection 210 is dimensioned relative to the base portion 190 to contact the section 60 of the side surface 56. The third sealing projection 210 is pre-stressed when the second seal 168 is installed to the side surface 56 of the second door 16. In other words, upon installation of the second seal 168, the third sealing projection 210 and the structure of the second seal 168 are configured to provide the second sealing projection 206 with additional force for sealing against the first sealing projection 86. Consequently, when the second sealing projection 206 is pressed against the first sealing projection 86, contact between the third sealing projection 210 and the section 60 of the side surface 56 of the second door 16 stiffens the second sealing projection 206 so that it more firmly engages the first sealing projection 86, as shown in FIG. 19. The third sealing projection 210 provides a force that counteracts the force of the first sealing projection 86 elastically deforming the second sealing projection 206 when the second door 16 is closed against the first door 14, as shown in FIG. 19. Thus, the third sealing projection 210 pushes, presses or otherwise provides force that assists in maintaining a sealing relationship between the second sealing projection 206 and the first sealing projection 86 with the second door 16 in the closed position, as shown in FIG. 19.

As with the first embodiment, in the second embodiment, the second seal 168 can extend the full overall height of the second door 16 such that first sealing line 120 second sealing line 122 also extend the full overall height of the second door 16.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the sealing arrangement of the vehicle body structure. Accordingly, these terms, as utilized to describe the present invention should be interpreted relative to a vehicle equipped with the sealing arrangement of the vehicle body structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle body structure comprising:
   a first body structure;
   a second body structure movably mounted relative to the first body structure between an open position in which the second body structure exposes an opening in the vehicle body structure and a closed position in which the second body structure conceals the opening in the vehicle body structure;
   a first seal installed on one of the first and second body structures, the first seal having a first sealing surface extending in a vertical direction of the vehicle body structure and a first sealing projection spaced apart from the first sealing surface; and
   a second seal installed on the other of the first and second body structures, the second seal having a second sealing surface extending in the vertical direction of the vehicle body structure and a second sealing projection spaced apart from the second sealing surface, the first and second sealing surfaces and the first and second sealing projections extending such that with the second body structure in the closed position and adjacent the first body structure, the second sealing surface contacts the first sealing surface to form a first vertical sealing line between the first and second body structures and the second sealing projection contacts the first sealing projection to form a second vertical sealing line between the first and second body structures along at least upper portions of the first and second body structures by elastic deformation of at least one of the first and second sealing projections.

2. The vehicle body structure according to claim 1, wherein the second seal includes a base section, with the second sealing surface and the second sealing projection being unitarily formed as a single monolith element with the base section.

3. The vehicle body structure according to claim 1, wherein the first sealing projection forms a rib extending in the vertical direction of the vehicle body structure, and the second sealing projection forms a lip seal extending in the vertical direction of the vehicle body structure.

4. The vehicle body structure according to claim 1, wherein the first body structure includes an exterior surface and an interior surface with a first side surface extending therebetween, the first seal being fixedly attached to the first side surface, and the second body structure includes an exterior surface and an interior surface with a second side surface extending therebetween, the second seal being fixedly attached to the second side surface.

5. The vehicle body structure according to claim 4, wherein the first and second body structures are first and second vehicle doors, respectively, which are pivotally attached to a vehicle body.

6. The vehicle body structure according to claim 5, wherein the second side surface of the second vehicle door is arranged to overlap with the first side surface of the first vehicle door as viewed in a perpendicular to the exterior surfaces of the first and second vehicle doors while the second door is in the closed position with the first and second seals contacting each other.

7. The vehicle body structure according to claim 6, wherein the first side surface of the first vehicle door includes the first seal and faces in an outbound direction of the vehicle body structure, and the second side surface of the second vehicle door includes the second seal and faces in an inbound direction of the vehicle body structure.

8. The vehicle body structure according to claim 4, wherein the second seal includes a third sealing projection having an initial unstressed state while the second body structure is in the open position and a deformed state occurring while the second body structure is in the closed position with the first and second seals contacting each other, the third sealing projection being configured and arranged relative to the second side surface such that elastic deformation of the third sealing projection from the initial unstressed state to the deformed state causes the third sealing projection to be pressed against the second side surface.

9. The vehicle body structure according to claim 8, wherein the second seal includes a base section and a vertical bending section disposed between the base section and the second and third sealing projections such that elastic deformation of the second seal while the second body structure is in the closed position with the first and second seals contacting each other causes the second seal to bend along the vertical bending section with respect to the base section.

10. The vehicle body structure according to claim 9, wherein
the second seal includes at least one hollow portion that is disposed between the base section and the second sealing surface.

11. The vehicle body structure according to claim 1, wherein
the second seal includes a base section and at least one hollow portion that is disposed between the base section and the second sealing surface.

12. The vehicle body structure according to claim 1, wherein
one of the first and second seals includes an upper sealing projection that is fixed to an upper end thereof and that extends over respective upper ends of the first and second sealing surfaces and the first and second sealing projections while the second body structure is in the closed position with the first and second seals contacting each other.

13. The vehicle body structure according to claim 12, wherein
the upper sealing projection is an integral part of the first seal.

14. The vehicle body structure according to claim 13, wherein
the first sealing projection forms a rib extending in the vertical direction of the vehicle body structure, and
the second sealing projection forms a lip seal extending in the vertical direction of the vehicle body structure.

15. The vehicle body structure according to claim 14, wherein
the first seal includes a base section, with the first sealing surface, the first sealing projection and the upper sealing projection being all unitarily formed as a single monolith element with the base section.

16. The vehicle body structure according to claim 15, wherein
the first body structure includes a first vehicle door with a first side surface having the first seal disposed thereon, the first seal facing in an outbound direction of the vehicle body structure, and
the second body structure includes a second vehicle door with a first side surface having the second seal disposed thereon, the second seal facing in an inbound direction of the vehicle body structure.

17. The vehicle body structure according to claim 16, wherein
the first and second vehicle doors are pivotally attached to a vehicle body, with the second side surface of the second vehicle door overlapping the first side surface of the first vehicle door as viewed in a perpendicular to the exterior surfaces of the first and second vehicle doors while the second door is in the closed position with the first and second seals contacting each other.

18. The vehicle body structure according to claim 17, wherein
the first side surface has a stepped shape when viewed in cross-section, and
the second side surface has an overall shape that compliments the stepped shape of the first side surface.

19. The vehicle body structure according to claim 1, wherein
the first and second vertical seals are concealed with the second body structure in the closed position.

20. The vehicle body structure according to claim 1, wherein
the first and second body structures are vehicle doors that are pivotally attached to the vehicle.

* * * * *